US009813950B2

United States Patent
Liu (10) Patent No.: US 9,813,950 B2
(45) Date of Patent: Nov. 7, 2017

(54) METHOD AND APPARATUS FOR MANAGING A CALL DURING A HANDOVER PROCEDURE IN A COMMUNICATIONS SYSTEM

(71) Applicant: MediaTek Inc., Hsin-Chu (TW)

(72) Inventor: Te-Huang Liu, Zhubei, Hsinchu County (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

(21) Appl. No.: 14/903,282

(22) PCT Filed: May 5, 2015

(86) PCT No.: PCT/CN2015/078282
§ 371 (c)(1),
(2) Date: Jan. 6, 2016

(87) PCT Pub. No.: WO2015/169210
PCT Pub. Date: Nov. 12, 2015

(65) Prior Publication Data
US 2016/0150444 A1    May 26, 2016

Related U.S. Application Data

(60) Provisional application No. 61/988,392, filed on May 5, 2014.

(51) Int. Cl.
*H04W 36/00* (2009.01)
*H04W 24/08* (2009.01)
*H04W 36/12* (2009.01)

(52) U.S. Cl.
CPC ....... *H04W 36/0022* (2013.01); *H04W 36/12* (2013.01)

(58) Field of Classification Search
CPC . H04W 36/00; H04W 36/12; H04W 36/0022; H04W 24/08
(Continued)

(56) References Cited

U.S. PATENT DOCUMENTS

| 2011/0009120 A1* | 1/2011 | You | H04W 36/0022 455/436 |
| 2013/0083777 A1* | 4/2013 | Rydnell | H04W 36/0022 370/331 |

(Continued)

FOREIGN PATENT DOCUMENTS

EP    2627122 A1    8/2013

OTHER PUBLICATIONS

International Search Report and Written Opinion for PCT/CN2015/078282 dated (Aug. 11, 2015).
(Continued)

*Primary Examiner* — Khawar Iqbal
(74) *Attorney, Agent, or Firm* — McClure, Qualey & Rodack, LLP (57) ABSTRACT

A method for managing a call during a handover procedure in a communications system is disclosed. The method is used in a user equipment (UE). The method includes: receiving a request for disconnecting a voice call from an end user; determining whether a Single Radio Voice Call Continuity (SRVCC) or Reverse Single Radio Voice Call Continuity (rSRVCC) handover procedure is being performed; and performing an action for the voice call when the request for disconnecting the voice call is received during the SRVCC or rSRVCC handover procedure.

18 Claims, 4 Drawing Sheets

(58) Field of Classification Search
USPC ..................................... 455/436, 444, 456.1
See application file for complete search history.

(56) References Cited

U.S. PATENT DOCUMENTS

| | | | | |
|---|---|---|---|---|
| 2013/0336127 | A1* | 12/2013 | Wu | H04W 36/0022 370/241 |
| 2015/0110069 | A1* | 4/2015 | Keller | H04W 36/0022 370/331 |
| 2015/0207827 | A1* | 7/2015 | Jheng | H04W 36/0022 370/260 |
| 2015/0282013 | A1* | 10/2015 | Kim | H04L 65/1069 370/331 |
| 2016/0072852 | A1* | 3/2016 | Keller | H04L 65/1016 370/352 |
| 2016/0157136 | A1* | 6/2016 | Hori | H04W 72/04 370/331 |
| 2016/0262058 | A1* | 9/2016 | Jeong | H04W 60/00 |
| 2016/0309439 | A1* | 10/2016 | Wu | H04W 8/02 |
| 2016/0330666 | A1* | 11/2016 | Keller | H04W 48/18 |
| 2016/0337908 | A1* | 11/2016 | Poikselka | H04W 36/0027 |
| 2016/0360448 | A1* | 12/2016 | Hori | H04W 36/0022 |
| 2017/0078473 | A1* | 3/2017 | DeLuca | H04W 76/06 |

OTHER PUBLICATIONS

3rd Generation Partnership Project; Technical Specification Group Services and System Aspects; Single Radio Voice call Continuity (SRVCC); Stage 2 (Release 12). Dec. 2013.

* cited by examiner

METHOD AND APPARATUS FOR MANAGING A CALL DURING A HANDOVER PROCEDURE IN A COMMUNICATIONS SYSTEM

CROSS REFERENCE TO RELATED APPLICATIONS

This application claims priority of U.S. Provisional Patent Application No. 61/988,392, filed on May 5, 2014, the entirety of which is incorporated by reference herein.

TECHNICAL FIELD

Aspects of the present invention relate generally to wireless communications systems, and more particularly, to methods and apparatuses for managing a call during a Single Radio Voice Call Continuity (SRVCC) handover procedure or a Reverse Single Radio Voice Call Continuity (rSRVCC) handover procedure in a communications system.

BACKGROUND

Wireless communications systems are widely deployed to provide various types of communication such as voice, packet data, and so on. These systems may be based on code division multiple access (CDMA), time division multiple access (TDMA), frequency division multiple access (FDMA), or other multiple access techniques. For example, such systems can conform to standards such as Third-Generation Partnership Project 2 (3GPP2, or "CDMA2000"), Third-Generation Partnership (3GPP, or "Wideband Code Division Multiple Access (W-CDMA)"), or Long Term Evolution ("LTE").

Voice over LTE (VoLTE) and Voice over HSPA (VoHSPA) are two technologies which enables voice services in LTE and 3G High Speed Packet Access (HSPA) networks based on IP Multimedia Subsystem (IMS). To provide voice call continuity for end users moving between an IMS-voice-supported area and a non-IMS-voice-supported area, 3GPP introduces two inter-radio-access-technology (inter-RAT) handover procedures, the SRVCC handover procedure and the rSRVCC handover procedure, to ensure that voice calls can be handed over between IMS and legacy systems in a seamless manner.

The SRVCC handover procedure allows an IMS call (which can be a VoLTE call or a VoHSPA call) to be transferred from IMS to the legacy system and become a Circuit Switched (CS) call in the 2G or 3G network. While the SRVCC handover procedure is a PS-to-CS handover procedure, the rSRVCC handover procedure on the contrary is a CS-to-PS handover procedure which allows a CS call in the 2G or 3G network to be transferred from a legacy system to IMS and become a VoLTE call or a VoHSPA call.

When a user equipment (UE) with an ongoing call is moving between an IMS-voice-supported area and a non-IMS-voice-supported area, the network can trigger SRVCC or rSRVCC handover procedures to ensure that the call can be continued between IMS and the legacy system. Taking VoLTE as an example, when a UE with an active VoLTE call is moving out of the coverage of the LTE network, the network can trigger an LTE-to-2G SRVCC handover procedure to hand over the UE from the LTE network to the 2G network and at the same time make the VoLTE call become a CS call in the 2G network.

The SRVCC and rSRVCC handover procedures are actually an access domain transfer procedure for voice calls. When a voice call on the IMS domain is being transferred to the CS domain through an SRVCC handover procedure or a voice call on the CS domain is being transferred to the IMS domain through an rSRVCC handover procedure, the access domain of the voice call is temporarily uncertain to the UE because the handover procedure has not been completed. It depends on the result of the handover procedure (i.e., success or failure) that decides whether the access domain of the voice call is changed or not. As the access domain of a call during an SRVCC handover procedure or during an rSRVCC handover procedure is uncertain, how to handle a voice call when the UE receives a request for disconnecting the voice call, or receives a request for placing the voice call on hold from an end user during an SRVCC handover procedure or an rSRVCC handover procedure is an important issue to be researched and discussed.

SUMMARY

A detailed description is given in the following embodiments with reference to the accompanying drawings.

Methods and apparatuses for managing a call during a handover procedure in a communications system are provided.

In one exemplary embodiment, the invention is directed to a method for managing a call during a handover procedure in a communications system. The method is used in a user equipment (UE), and comprises: receiving a request for disconnecting a voice call from an end user; determining whether a Single Radio Voice Call Continuity (SRVCC) or Reverse Single Radio Voice Call Continuity (rSRVCC) handover procedure is being performed; and performing an action for the voice call when the request for disconnecting the voice call is received during the SRVCC or rSRVCC handover procedure.

In one exemplary embodiment, the invention is directed to a method for managing a call during a handover procedure in a communications system. The method is used in a user equipment (UE), and comprises: receiving a request for placing a voice call on hold from an end user; determining whether a Single Radio Voice Call Continuity (SRVCC) or Reverse Single Radio Voice Call Continuity (rSRVCC) handover procedure is being performed; and performing an action for the voice call when the request for placing the voice call on hold is received during the SRVCC or rSRVCC handover procedure.

In one exemplary embodiment, the invention is directed to an apparatus for managing a call during a handover procedure in a communications system. The apparatus operates as a User Equipment (UE) and at least comprises a user interface, a determination module and a call management module. The user interface receives a request for disconnecting a voice call from an end user. The determination module determines whether a Single Radio Voice Call Continuity (SRVCC) or Reverse Single Radio Voice Call Continuity (rSRVCC) handover procedure is being performed. The call management module performs an action for the voice call when the request for disconnecting the voice call is received during the SRVCC or rSRVCC handover procedure.

In one exemplary embodiment, the invention is directed to an apparatus for managing a call during a handover procedure in a communications system. The apparatus operates as a User Equipment (UE) and at least comprises a user interface, a determination module and a call management module. The user interface receives a request for placing a voice call on hold from an end user. The determination module determines whether a Single Radio Voice Call Continuity (SRVCC) or Reverse Single Radio Voice Call Continuity (rSRVCC) handover procedure is being performed. The call management module performs an action for the voice call when the request for placing the voice call on hold is received during the SRVCC or rSRVCC handover procedure.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION

Several exemplary embodiments of the present disclosure are described with reference to FIGS. 1 through 4, which generally relate to a method and an apparatus for managing a call during a handover procedure in a communications system. It is to be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

In all exemplary embodiments of the present invention, the wireless communication system includes at least the wireless communication network and the wireless communication apparatus. The wireless communication network may include more than one operation mode, or it may include more than two sub-networks. For example, the wireless communication network may include a Universal Mobile Telephone System Terrestrial Radio Access Network (UTRAN), an evolved UTRAN (E-UTRAN), and a Global System for Mobile communications (GSM) Enhanced data rate for GSM evolution radio access network (hereinafter abbreviated as GERAN). Similarly, the wireless communication apparatus may also have the capability to transmit information to and receive information from the UTRAN, the E-UTRAN, and the GERAN. The above-described wireless communication system is not intended to limit the present invention, and the wireless communication system may include more than one wireless communication network and more than one wireless communication apparatus.

Figure 1:
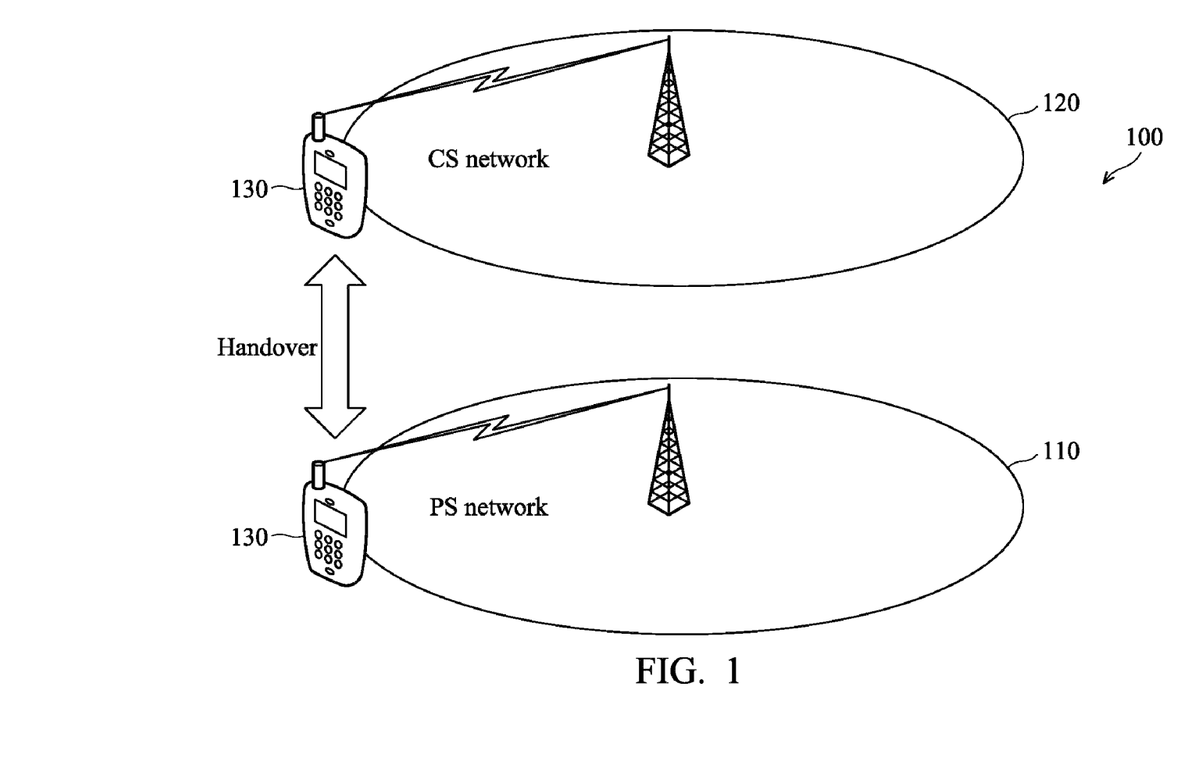
FIG. 1 a schematic diagram illustrating a wireless communications system according to one embodiment of the present invention.

FIG. 1 is a schematic diagram illustrating a wireless communications system 100 according to one embodiment of the present invention. The wireless communications system 100 may include a PS network 110, a CS network 120 and a UE 130. The PS network 110 may be an LTE or HSPA network, and may include a plurality of LTE/HSPA base stations to provide IMS calls. The CS network 120 may be a Mobile communications (GSM), Universal Mobile Telecommunications System (UMTS), or Code Division Multiple Access 2000 (CDMA2000) network, and may include a plurality of GSM/UMTS/CDMA2000 base stations to provide CS calls. The UE 130 may be a device such as a mobile phone, a computer system, etc. Besides, the network and the UE 130 can be each seen as a transmitter or receiver according to transmission direction, e.g., for uplink (UL), the UE 130 is the transmitter and the network is the receiver, and for downlink (DL), the network is the transmitter and the UE 130 is the receiver.

The UE 130 may establish an IMS call with the PS network 110 or establish a CS call with the CS network 120, and demonstrate the call state of the IMS/CS call on a user interface (not shown in FIG. 1) to its user. The PS network 110 may request that the UE 130 performs an SRVCC handover for the IMS call from the PS network 110 to the CS network 120 by sending an SRVCC handover command, and the CS network 120 may request that the UE 130 performs an rSRVCC handover for the CS call from the CS network 120 to the PS network 110 by sending an rSRVCC handover command.

Figure 2:
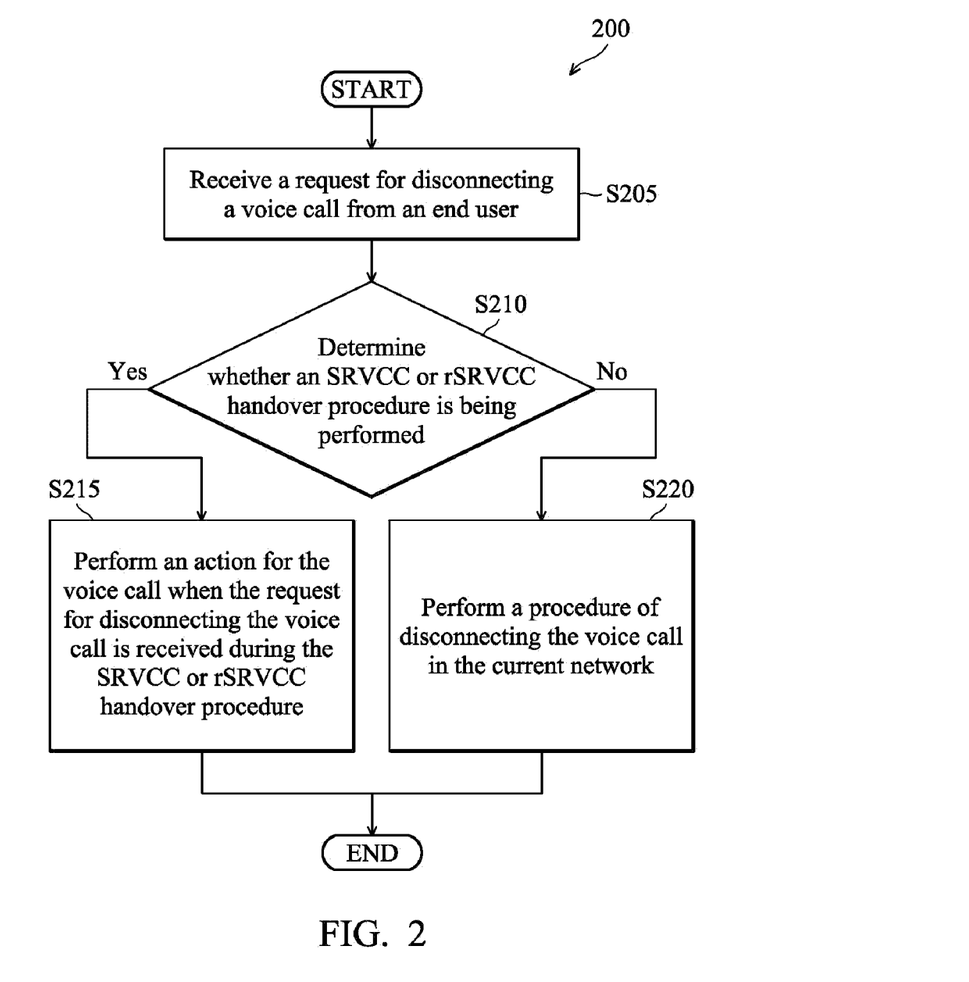
FIG. 2 is a flow diagram illustrating a method for managing a call during a handover procedure in a wireless communication system according to an embodiment of the present invention.

FIG. 2 is a flow diagram 200 illustrating a method for managing a call during a handover procedure in a wireless communication system according to an embodiment of the present invention. In the embodiment of FIG. 2, an end user transmits a request to the UE for disconnecting a voice call prior to step S205. In step S205, the UE receives the request for disconnecting the voice call from the end user. Next, in step S210, the UE determines whether an SRVCC or rSRVCC handover procedure is being performed. When the UE finds that there is an SRVCC handover procedure or an rSRVCC handover procedure being performed, the method proceeds to step S215. In step S215, the UE performs an action for the voice call when the request for disconnecting the voice call is received during the SRVCC or rSRVCC handover procedure. When the UE finds that there is no any SRVCC or rSRVCC handover procedure being performed, the flow goes to step S220. In step S220, the UE performs a procedure of disconnecting the voice call in the current network.

The action performed by the UE in step S215 of FIG. 2 may be one of the following:

(i) The UE defers disconnecting the voice call until the SRVCC or rSRVCC handover procedure is over. When the SRVCC or rSRVCC handover procedure ends, the UE signals the network to disconnect the voice call on the current access domain of the voice call (i.e., the CS domain or the IMS domain) only when the voice call is not released during the SRVCC or rSRVCC handover procedure.

(ii) The UE releases the voice call locally.

(iii) The UE starts a timer and defers disconnecting the voice call. When the timer expires before the SRVCC or rSRVCC handover procedure ends, the UE locally releases the voice call. When the SRVCC or rSRVCC handover procedure ends before the timer expires, the UE signals the network to disconnect the voice call on the current access domain of the voice call (i.e., the CS domain or the IMS domain) only when the voice call is not released during the SRVCC or rSRVCC handover procedure.

(iv) The UE rejects the request and informs the end user of an error.

Figure 3:
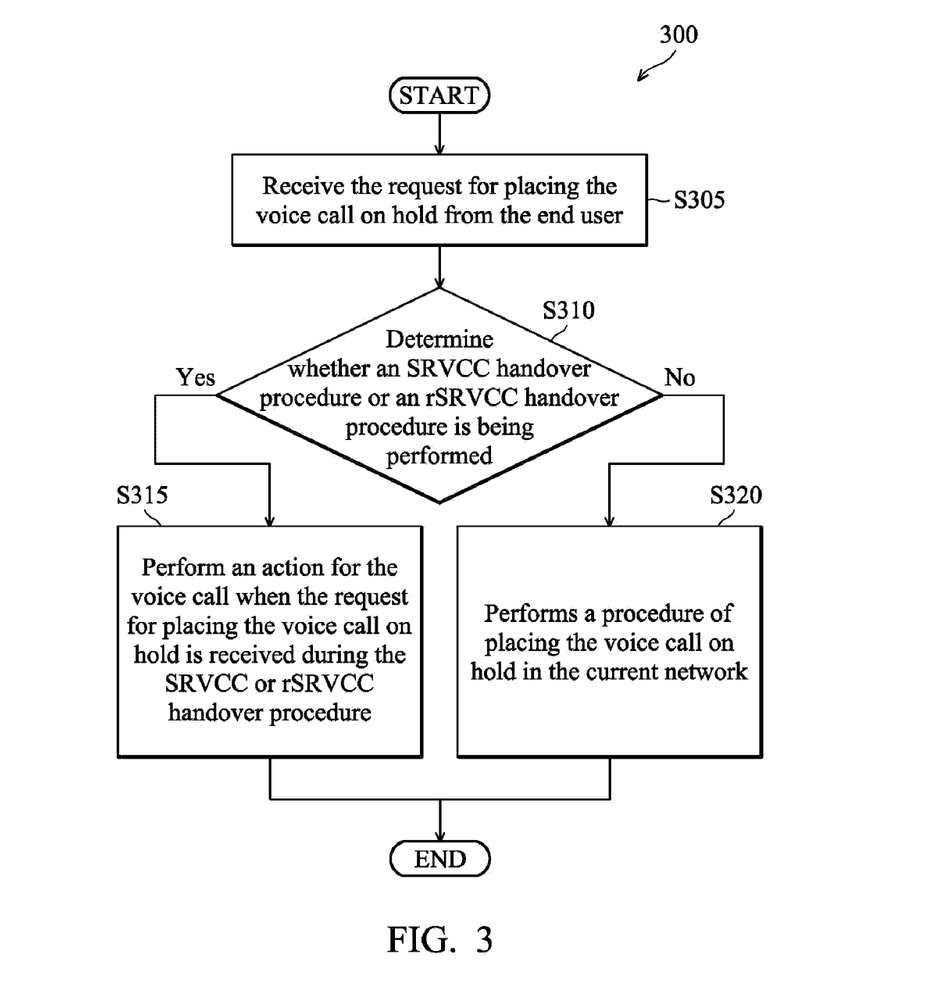
FIG. 3 is a flow diagram illustrating a method for managing a call during a handover procedure in a wireless communication system according to an embodiment of the present invention.

FIG. 3 is a flow diagram 300 illustrating a method for managing a call during a handover procedure in a wireless communication system according to an embodiment of the present invention. In the embodiment of FIG. 3, an end user transmits a request to the UE for placing a voice call on hold prior to step S305. In step S305, the UE receives the request for placing the voice call on hold from the end user. Next, in step S310, the UE determines whether an SRVCC handover procedure or an rSRVCC handover procedure is being performed. When the UE finds that there is an SRVCC handover procedure or an rSRVCC handover procedure being performed, the method proceeds to step S315. In step S315, the UE performs an action for the voice call when the request for placing the voice call on hold is received during the SRVCC or rSRVCC handover procedure. When the UE finds that there is no any SRVCC or rSRVCC handover procedure being performed, the flow goes to step S320. In step S320, the UE performs a procedure of placing the voice call on hold in the current network.

The action performed by the UE in step S315 of FIG. 3 may be one of the following:

(i) The UE defers placing the voice call on hold until the SRVCC or rSRVCC handover procedure is over. When the SRVCC or rSRVCC handover procedure ends, the UE signals the network to place the voice call on hold on the current access domain of the voice call only when the voice call is not released during the SRVCC or rSRVCC handover procedure.

(ii) The UE rejects the request and informs the end user of an error.

(iii) The UE places the voice call on hold locally.

(iv) The UE starts a timer and defers placing the voice call on hold. When the timer expires before the SRVCC or rSRVCC handover procedure is over, the UE locally places the voice call on hold. When the SRVCC or rSRVCC handover procedure ends before the timer expires, the UE signals the network to place the voice call on hold on the current access domain of the voice call only when the voice call is not released during the SRVCC or rSRVCC handover procedure.

(v) The UE starts a timer and defers placing the voice call on hold. When the timer expires before the SRVCC or rSRVCC handover procedure is over, the UE rejects the request for placing the voice call on hold and informs the end user of an error. When the SRVCC or rSRVCC handover procedure ends before the timer expires, the UE signals the network to place the voice call on hold on the current access domain of the voice call only when the voice call is not released during the SRVCC or rSRVCC handover procedure.

The present invention also proposes a wireless communication apparatus using the method for managing a call during a handover procedure in a wireless communication system. The wireless communication apparatus is described in detail below.

Figure 4:
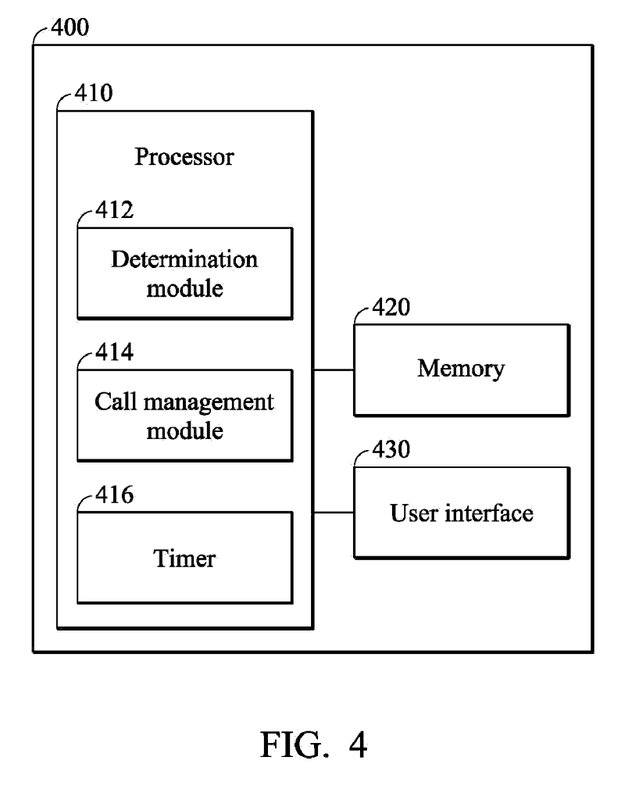
FIG. 4 is a schematic block diagram illustrating a structure of a wireless communication apparatus for managing a call during a handover procedure in a communications system according to an embodiment of the present invention.

FIG. 4 is a schematic block diagram illustrating the structure of a wireless communication apparatus 400 for managing a call during a handover procedure in a communications system according to an embodiment of the present invention. The wireless communication apparatus 400 operates as the UE 130 in FIG. 1. Referring to FIG. 4, the wireless communication apparatus 400 includes a processor 410, a memory 420 and a user interface 430. The processor 410 is coupled to the memory 420 and the user interface 430, and further comprises a determination module 412, a call management module 414 and a timer 416.

The user interface 430 can be a touch screen, a button and so on, and receives a request for disconnecting a voice call or placing a voice call on hold from an end user. The determination module 412 determines whether an SRVCC or rSRVCC handover procedure is being performed. The call management module 414 performs an action for the voice call when the request for disconnecting the voice call or placing the voice call on hold is received during the SRVCC or rSRVCC handover procedure.

The memory 420 stores software programs or software modules related to the determination module 412, the call management module 414, the timer 416, the user interface 430 and signals for performing an action during the SRVCC or rSRVCC handover procedure. The memory 420 may be one or more memory devices adapted for storing data and software programs. For example, the memory 420 may be a RAM, a ROM, a magnetic storage device, a flash memory storage device, or an optical storage device.

The processor 410 executes the determination module 412, the call management module 414, the timer 416 and the user interface 430. In addition, the processor 410 may execute other software applications or software modules stored on the memory 420.

The wireless communication apparatus 400 may transmit information to and receive information from the wireless communication network (e.g., the E-UTRAN, the UTRAN, and the GERAN) and may apply any of the above-described exemplary processes for handling at least a call in handover in the wireless communication system according to the exemplary embodiments mentioned previously.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in various ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for managing a call during a handover procedure in a communications system, the method being used in a user equipment (UE), comprising:
   receiving a request for disconnecting a voice call from an end user;
   determining whether a Single Radio Voice Call Continuity (SRVCC) or Reverse Single Radio Voice Call Continuity (rSRVCC) handover procedure is being performed; and
   performing an action for the voice call when the request for disconnecting the voice call is received during the SRVCC or rSRVCC handover procedure, wherein the performing the action comprises releasing the voice call locally.

2. The method as claimed in claim 1, wherein the performing the action comprises:
   deferring disconnecting the voice call until the SRVCC or rSRVCC handover procedure is over; and
   signaling a network to disconnect the voice call on a current access domain of the voice call when the voice call is not released during the SRVCC or rSRVCC handover procedure.

3. The method as claimed in claim 1, wherein the performing the action comprises:
   starting a timer and deferring disconnecting the voice call;
   releasing the voice call locally when the timer expires before the SRVCC or rSRVCC handover procedure is over; or
   signaling a network to disconnect the voice call on a current access domain of the voice call when the SRVCC or rSRVCC handover procedure is over before the timer expires and only when the voice call is not released during the SRVCC or rSRVCC handover procedure.

4. The method as claimed in claim 1, wherein the performing the action comprises:
   rejecting the request; and
   informing the end user of an error.

5. A method for managing a call during a handover procedure in a communications system, the method is used in a user equipment (UE), comprising:
   receiving a request for placing a voice call on hold from an end user;
   determining whether a Single Radio Voice Call Continuity (SRVCC) or Reverse Single Radio Voice Call Continuity (rSRVCC) handover procedure is being performed; and
   performing an action for the voice call when the request for placing the voice call on hold is received during the SRVCC or rSRVCC handover procedure, wherein the performing the action comprises releasing the voice call locally.

6. The method as claimed in claim 5, wherein the performing the action comprises:
  deferring placing the voice call on hold until the SRVCC or rSRVCC handover procedure is over; and
  signaling a network to place the voice call on hold on a current access domain of the voice call when the voice call is not released during the SRVCC or rSRVCC handover procedure.

7. The method as claimed in claim 5, wherein the performing the action comprises:
  rejecting the request; and
  informing the end user of an error.

8. The method as claimed in claim 5, wherein the performing the action comprises:
  starting a timer and deferring placing the voice call on hold; and
  placing the voice call on hold locally when the timer expires before the SRVCC or rSRVCC handover procedure is over; or
  signaling a network to place the voice call on hold on a current access domain of the voice call when the SRVCC or rSRVCC handover procedure is over before the timer expires and only when the voice call is not released during the SRVCC or rSRVCC handover procedure.

9. The method as claimed in claim 5, wherein the performing the action comprises:
  starting a timer and deferring placing the voice call on hold; and
  rejecting the request and informing the end user of an error when the timer expires before the SRVCC or rSRVCC handover procedure is over; or
  signaling a network to place the voice call on hold on a current access domain of the voice call when the SRVCC or rSRVCC handover procedure is over before the timer expires and only when the voice call is not released during the SRVCC or rSRVCC handover procedure.

10. An apparatus for managing a call during a handover procedure in a communications system, operating as a User Equipment (UE), at least comprising:
  a user interface, receiving a request for disconnecting a voice call from an end user;
  a determination module, determining whether a Single Radio Voice Call Continuity (SRVCC) or Reverse Single Radio Voice Call Continuity (rSRVCC) handover procedure is being performed; and
  a call management module, performing an action for the voice call when the request for disconnecting the voice call is received during the SRVCC or rSRVCC handover procedure, wherein the action performed by the call management module comprises releasing the voice call locally.

11. The apparatus for managing a call during a handover procedure in a communications system as claimed in claim 10, wherein the action performed by the call management module comprises:
  deferring disconnecting the voice call until the SRVCC or rSRVCC handover procedure is over; and
  signaling a network to disconnect the voice call on a current access domain of the voice call when the voice call is not released during the SRVCC or rSRVCC handover procedure.

12. The apparatus for managing a call during a handover procedure in a communications system as claimed in claim 10, wherein the action performed by the call management module comprises:
  starting a timer and deferring disconnecting the voice call;
  releasing the voice call locally when the timer expires before the SRVCC or rSRVCC handover procedure is over; or
  signaling a network to disconnect the voice call on a current access domain of the voice call when the SRVCC or rSRVCC handover procedure is over before the timer expires and only when the voice call is not released during the SRVCC or rSRVCC handover procedure.

13. The apparatus for managing a call during a handover procedure in a communications system as claimed in claim 10, wherein the action performed by the call management module comprises:
  rejecting the request; and
  informing the end user of an error.

14. An apparatus for managing a call during a handover procedure in a communications system, operating as a User Equipment (UE), at least comprising:
  a user interface, receiving a request for placing a voice call on hold from an end user;
  a determination module, determining whether a Single Radio Voice Call Continuity (SRVCC) or Reverse Single Radio Voice Call Continuity (rSRVCC) handover procedure is being performed; and
  a call management module, performing an action for the voice call when the request for placing the voice call on hold is received during the SRVCC or rSRVCC handover procedure, wherein the action performed by the call management module comprises releasing the voice call locally.

15. The apparatus for managing a call during a handover procedure in a communications system as claimed in claim 14, wherein the action performed by the call management module comprises:
  deferring placing the voice call on hold until the SRVCC or rSRVCC handover procedure is over; and
  signaling a network to place the voice call on hold on a current access domain of the voice call when the voice call is not released during the SRVCC or rSRVCC handover procedure.

16. The apparatus for managing a call during a handover procedure in a communications system as claimed in claim 14, wherein the action performed by the call management module comprises:
  rejecting the request; and
  informing the end user of an error.

17. The apparatus for managing a call during a handover procedure in a communications system as claimed in claim 14, wherein the action performed by the call management module comprises:
  starting a timer and defer placing the voice call on hold; and
  placing the voice call on hold locally when the timer expires before the SRVCC or rSRVCC handover procedure is over; or
  signaling a network to place the voice call on hold on a current access domain of the voice call when the SRVCC or rSRVCC handover procedure is over before the timer expires and only when the voice call is not released during the SRVCC or rSRVCC handover procedure.

18. The apparatus for managing a call during a handover procedure in a communications system as claimed in claim 14, wherein the action performed by the call management module comprises:

starting a timer and deferring placing the voice call on hold; and rejecting the request and inform the end user of an error when the timer expires before the SRVCC or rSRVCC handover procedure is over; or signaling a network to place the voice call on hold on a current access domain of the voice call when the SRVCC or rSRVCC handover procedure is over before the timer expires and only when the voice call is not released during the SRVCC or rSRVCC handover procedure.

* * * * *